United States Patent
Cheng et al.

(10) Patent No.: US 12,021,256 B2
(45) Date of Patent: Jun. 25, 2024

(54) SEPARATOR INCLUDING COATING LAYER WITH ORGANIC CORE-SHELL STRUCTURE WITH LOWER MELTING SHELL AND HIGHER MELTING CORE, ELECTROCHEMICAL DEVICES INCLUDING THE SAME, AND METHODS FOR MAKING THE SAME

(71) Applicant: SHANGHAI ENERGY NEW MATERIALS TECHNOLOGY CO., LTD., Shanghai (CN)

(72) Inventors: Alex Cheng, Shanghai (CN); Xudong Li, Shanghai (CN); Gang Min, Shanghai (CN); Honggui Deng, Shanghai (CN); Hui Chen, Shanghai (CN); Qi Yue, Shanghai (CN); Chao Feng, Shanghai (CN); Xianghua Li, Shanghai (CN); Kang Wang, Shanghai (CN); An Wang, Shanghai (CN); Yangyang Chen, Shanghai (CN)

(73) Assignee: SHANGHAI ENERGY NEW MATERIALS TECHNOLOGY CO., LTD., Shanghai (CN)

( * ) Notice: Subject to any disclaimer, the term of this patent is extended or adjusted under 35 U.S.C. 154(b) by 517 days.

(21) Appl. No.: 17/254,390

(22) PCT Filed: Jun. 24, 2019

(86) PCT No.: PCT/CN2019/092532
§ 371 (c)(1),
(2) Date: Dec. 21, 2020

(87) PCT Pub. No.: WO2019/242777
PCT Pub. Date: Dec. 26, 2019

(65) Prior Publication Data
US 2021/0273297 A1    Sep. 2, 2021

(51) Int. Cl.
*H01M 50/403* (2021.01)
*H01M 50/417* (2021.01)
(Continued)

(52) U.S. Cl.
CPC ....... *H01M 50/403* (2021.01); *H01M 50/417* (2021.01); *H01M 50/434* (2021.01);
(Continued)

(58) Field of Classification Search
CPC ............. H01M 50/403; H01M 50/489; H01M 50/417; H01M 50/491; H01M 50/457;
(Continued)

(56) References Cited

U.S. PATENT DOCUMENTS

| 2014/0322587 | A1 | 10/2014 | Lai et al. | |
| 2015/0050544 | A1* | 2/2015 | Nam | H01M 50/457 |
| | | | | 429/144 |

(Continued)

FOREIGN PATENT DOCUMENTS

| CN | 102244221 A | 11/2011 |
| CN | 104157811 A | 11/2014 |

(Continued)

OTHER PUBLICATIONS

International Search Report issued in related PCT Application No. PCT/CN2019/092532 dated Sep. 27, 2019.

(Continued)

*Primary Examiner* — Sean P Cullen
(74) *Attorney, Agent, or Firm* — Locke Lord LLP; Tim Tingkang Xia, Esq.

(57) ABSTRACT

Disclosed are a separator for an electrochemical device, comprising a porous base membrane, a coating layer disposed on at least one side of the porous base membrane and at least one channel for ionic flow, wherein the coating layer comprises at least one organic material with, for example, a (Continued)

core-shell structure that melts when the electrochemical device is overheated to a temperature that is higher than the melting point of the at least one organic material to block the at least one channel for ionic flow; as well as an electrochemical device comprising the separator and a method for making the separator.

25 Claims, 3 Drawing Sheets

(51) Int. Cl.
| | |
|---|---|
| *H01M 50/434* | (2021.01) |
| *H01M 50/443* | (2021.01) |
| *H01M 50/446* | (2021.01) |
| *H01M 50/451* | (2021.01) |
| *H01M 50/457* | (2021.01) |
| *H01M 50/489* | (2021.01) |
| *H01M 50/491* | (2021.01) |

(52) U.S. Cl.
CPC ....... *H01M 50/443* (2021.01); *H01M 50/446* (2021.01); *H01M 50/451* (2021.01); *H01M 50/457* (2021.01); *H01M 50/489* (2021.01); *H01M 50/491* (2021.01)

(58) Field of Classification Search
CPC ............. H01M 50/446; H01M 50/443; H01M 50/451; H01M 50/434
USPC ......................................... 429/144, 251, 254
See application file for complete search history.

(56) References Cited

U.S. PATENT DOCUMENTS

| | | | |
|---|---|---|---|
| 2015/0270522 A1* | 9/2015 | Yamada | ................ H01M 50/44 429/145 |
| 2019/0237734 A1* | 8/2019 | Lee | ................... H01M 10/0565 |

FOREIGN PATENT DOCUMENTS

| | | | | | |
|---|---|---|---|---|---|
| CN | 104377328 A | | 2/2015 | | |
| CN | 106505172 A | * | 3/2017 | | |
| CN | 106684299 A | | 5/2017 | | |
| CN | 106887559 A | | 6/2017 | | |
| EP | 2838137 A1 | | 2/2015 | | |
| JP | 2008027839 A | | 2/2008 | | |
| JP | 2016025093 A | * | 2/2016 | | |
| JP | 2018172595 A | * | 11/2018 | ............ | C08F 259/08 |
| KR | 2017032722 A | * | 3/2017 | | |
| WO | 2007066768 A1 | | 6/2007 | | |
| WO | 2008114727 A1 | | 9/2008 | | |
| WO | 2013154623 A1 | | 10/2013 | | |
| WO | WO2013154623 | | 10/2013 | | |
| WO | 2018029580 A1 | | 2/2018 | | |
| WO | WO2018029580 | | 2/2018 | | |

OTHER PUBLICATIONS

Written Opinion issued in related PCT Application No. PCT/CN2019/092532 dated Sep. 27, 2019.

Supplementary European Search Report in counterpart EP Application No. 19822156.6 dated Mar. 31, 2022.

\* cited by examiner

SEPARATOR INCLUDING COATING LAYER WITH ORGANIC CORE-SHELL STRUCTURE WITH LOWER MELTING SHELL AND HIGHER MELTING CORE, ELECTROCHEMICAL DEVICES INCLUDING THE SAME, AND METHODS FOR MAKING THE SAME

CROSS REFERENCE TO RELATED APPLICATION

The present application is a national stage filing under 35 U.S.C. § 371 of International Application No. PCT/CN2019/092532, filed on Jun. 24, 2019, which claims the benefit of priority to PCT Application No. PCT/CN2018/092478 filed on Jun. 22, 2018, the content of these applications are each incorporated by reference.

TECHNICAL FIELD

The present disclosure relates to separators for electrochemical devices, electrochemical devices comprising the separator, and methods for making the separator.

BACKGROUND

With the growing market of energy storage, batteries and other forms of electrochemical devices are given more and more attentions. For example, lithium secondary batteries have been extensively used as energy sources in, for example, mobile phones, laptops, power tools, electrical vehicles, etc.

An electrode assembly of an electrochemical device usually comprises a positive electrode, a negative electrode, and a permeable membrane (i.e., separator) interposed between the positive electrode and the negative electrode. The positive electrode and the negative electrode are prevented from being in direct contact with each other by the separator, thereby avoiding internal short circuit. In the meanwhile, ions are allowed to pass the separator through channels within the separator so as to close the circuit during the passage of current. Separator is a critical component in an electrochemical device because its structure and property considerably affect the performances of the electrochemical device, including, for example, internal resistance, energy density, power density, cycle life, and safety, among which safety can always be the first requirement.

A separator is generally formed by a polymeric microporous membrane. Commercial polyolefin-based separators can offer the advantage of low cost, favorable chemical stability and excellent mechanical strength. However, they may shrink at a high temperature, resulting in a volume change and leading to direct contact of the positive electrode and the negative electrode. To reduce thermal shrinkage of the polyolefin-based separators, inorganic material-coated separators have been proposed in which a slurry comprising inorganic particles and a binder polymer is coated on at least one surface of the polyolefin-based membrane. In the inorganic material-coated separator, the inorganic particles in the coating layer can serve as a support to maintain a mechanical shape of the separator, and can help prevent the polyolefin-based membrane from thermally shrinking when the electrochemical device is overheated. In addition, polyolefin in the porous base membrane may melt to close pores of the base membrane when the temperature of the electrochemical device is higher than the melting point of the polyolefin in the base membrane, so that ions can be prevented from passing through the separator, potentially leading the electrochemical device to shut down.

To ensure the safety of electrochemical devices in an environment with high temperature, there is still a need to develop separators with a low thermal shrinkage and an effective shut-down mechanism.

SUMMARY OF THE INVENTION

The present disclosure provides a separator for an electrochemical device. Specifically, the separator disclosed herein comprises a porous base membrane, a coating layer disposed on at least one side of the porous base membrane, and at least one channel for ionic flow. The coating layer comprises at least one organic material that melts when the electrochemical device is overheated to a temperature that is higher than the melting point of the at least one organic material to block the at least one channel for ionic flow. In some embodiments, the at least one organic material is with a core-shell structure, comprising an inner core and an outer shell, wherein the melting temperature of the outer shell is different from that of the inner core; for example, the melting temperature of the outer shell is lower than that of the inner core. The at least one channel for ionic flow the separator disclosed herein can be blocked under different temperatures. The battery comprising the separator disclosed herein can be shut down at a temperature that is between the melting temperature of the outer shell and that of the inner core. In some embodiments, the coating layer comprises at least two organic materials with a core-shell structure, comprising an inner core of one organic material and an outer shell of another organic material, wherein the melting temperature of the outer shell is different from that of the inner core; for example, the melting temperature of the outer shell is lower than that of the inner core.

The present disclosure also provides methods for making the separator disclosed herein.

In one embodiment, a method for making the separator disclosed herein comprises: preparing a slurry comprising at least one organic material and deionized water; coating the slurry on at least one surface of a porous base membrane to form a wet coating layer; and drying the wet coating layer.

In another embodiment, a method for making the separator disclosed herein comprises: preparing a mixed slurry comprising at least one organic material, at least one inorganic material, and deionized water; coating the mixed slurry on at least one surface of a porous base membrane to form a wet coating layer; and drying the wet coating layer.

In another embodiment, a method for making the separator disclosed herein comprises: preparing an organic slurry comprising at least one organic material and deionized water; preparing an inorganic slurry comprising at least one inorganic material, at least one binding agent, at least one wetting agent, and deionized water; coating the organic slurry on at least one surface of the porous base membrane to form a first wet coating layer; drying the first wet coating layer to obtain an organic layer; coating the inorganic slurry on at least one surface of the organic layer to form a second wet coating layer; and drying the second wet coating layer.

Further, in an embodiment, a method for making the separator disclosed herein comprises: preparing an organic slurry comprising at least one organic material and deionized water; preparing an inorganic slurry comprising at least one inorganic material, at least one binding agent, at least one wetting agent, and deionized water; coating the inorganic slurry on at least one surface of the porous base membrane to form a first wet coating layer; drying the first wet coating layer to obtain an inorganic layer; coating the organic slurry on at least one surface of the inorganic layer to form a second wet coating layer; and drying the second wet coating layer.

In addition, in an embodiment, a method for making the separator disclosed herein comprises: preparing an organic slurry comprising at least one organic material and deionized water; preparing an inorganic slurry comprising at least one inorganic material, at least one binding agent, at least one wetting agent, and deionized water; coating the organic slurry on one side of the porous base membrane to form a first wet coating layer; drying the first wet coating layer to obtain an organic layer; coating the inorganic slurry on the other side of the porous base membrane to form a second wet coating layer; and drying the second wet coating layer.

The present disclosure also provides an electrochemical device. The electrochemical device disclosed herein includes a positive electrode, a negative electrode, and the separator disclosed herein, interposed between the positive electrode and the negative electrode.

DETAILED DESCRIPTION

Figure 1:
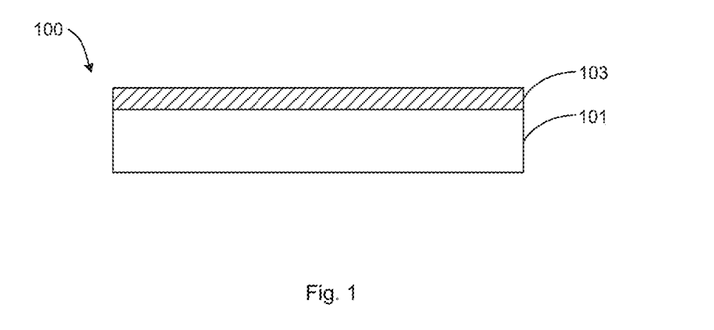
FIG. 1 illustrates a schematic diagram of an exemplary separator 100 according to one embodiment of the disclosure.

The present disclosure provides some exemplary embodiments of separators for electrochemical devices. In some embodiments of the present disclosure, a coating layer, which comprises at least one organic material, is disposed on at least one side of a porous base membrane. The coating layer may be disposed on only one side of the porous base membrane. For example, as shown in FIG. 1, the separator 100 comprises a porous base membrane 101 and a coating layer 103 comprising at least one organic material formed on one surface of the porous base membrane 101. In some other embodiments, the coating layer may be disposed on both sides of the porous base membrane.

The porous base membrane serves as a substrate. The porous base membrane disclosed herein may have a thickness ranging, for example, from 0.5 to 50 µm, such as from 0.5 to 20 µm, and further such as from 5 to 18 µm. The porous base membrane may have numerous pores inside, through which gas, liquid, or ions can pass from one surface side to the other surface side.

Any suitable porous membrane having an average pore size ranging, for example, from 0.01 to 50 µm, such as from 0.1 to 20 µm, further such as from 0.5 to 10 µm, can be used as the porous base membrane. Various materials, either organic or inorganic, can be used to prepare the porous base membrane. For example, the porous base membrane may comprise at least one chosen from polyolefin, aramids, polyamides, and various nonwoven fibers.

In some embodiments of the present disclosure, polyolefin-based porous membranes are used as the porous base membrane. Examples of polyolefin contained in the polyolefin-based porous membrane may include polyethylene (PE), high density polyethylene (HDPE), polypropylene (PP), polybutylene, polypentene, polymethylpentene (TPX), copolymers thereof, and mixtures thereof. The polyolefin disclosed herein may have a weight average molecular weight (Mw) ranging, for example, from 50,000 to 2,000,000, such as from 100,000 to 1,000,000. The pores within the polyolefin-based porous base membrane may have an average pore size ranging, for example, from 20 to 70 nm, such as from 30 to 60 nm. The polyolefin-based porous base membrane may have a porosity ranging, for example, from 25% to 50%, such as from 30% to 45%. Furthermore, the polyolefin-based porous base membrane may have an air permeability ranging, for example, from 50 to 400 sec/100 ml, such as from 80 to 300 sec/100 ml. In addition, the polyolefin-based porous membrane may have a single-layer structure or a multi-layer structure. A polyolefin-based porous membrane of the multi-layer structure may include at least two laminated polyolefin-based layers containing, for example, different types of polyolefin or the same type of polyolefin having different molecular weights. The polyolefin-based porous membrane disclosed herein can be prepared according to a conventional method known in the art, or can be purchased directly in the market.

In some other embodiments, a non-woven membrane may form at least one portion of the porous base membrane. The term "non-woven membrane" means a flat sheet including a multitude of randomly distributed fibers that form a web structure therein. The fibers generally can be bonded to each other or can be unbonded. The fibers can be staple fibers (i.e., discontinuous fibers of no longer than 10 cm in length) or continuous fibers. The fibers can comprise a single material or a multitude of materials, either as a combination of different fibers or as a combination of similar fibers each comprised of different materials. The non-woven membrane disclosed herein may, for example, exhibit dimensional stability, i.e., thermal shrinkage of less than 5% when heated to 100° C. in about two hours. The non-woven membrane may have a relatively large average pore size ranging, for example, from 0.1 to 20 µm, such as from 1 to 5 µm. The non-woven membrane may have a porosity ranging, for example, from 40% to 80%, such as from 50% to 70%. Furthermore, the non-woven membrane may have an air permeability of, for example, less than 500 sec/100 ml, such as ranging from 0 to 400 sec/100 ml, and further such as ranging from 0 to 200 sec/100 ml. Some examples of the non-woven membrane are formed of at least one material chosen from polyethylene (PE), high density polyethylene (HDPE), polypropylene (PP), polybutylene, polypentene, polymethylpentene (TPX), polyethylene terephthalate (PET), polyamide, polyimide (PI), polyacrylonitrile (PAN), viscose fiber, polyester, polyacetal, polycarbonate, polyetherketone (PEK), polyetheretherketone (PEEK), polybutylene terephthalate (PBT), polyethersulfone (PES), polyphenylene oxide (PPO), polyphenylene sulfide (PPS), polyethylene naphthalene (PEN), cellulose fiber, and copolymers thereof. In an embodiment, a non-woven membrane formed of PET is used as the porous base membrane. The non-woven porous membrane disclosed herein can be prepared according to a conventional method known in the art, such as electro-blowing, electro-spinning, and melt-blowing, or can be purchased directly in the market.

Besides the porous base membrane, the coating layer disclosed herein may also have a porous structure allowing gas, liquid, or ions pass from one surface side to the other surface side of the coating layer. As both the porous base membrane and the coating layer are porous, the separator disclosed herein has at least one channel for ionic flow passing from one surface side to the other surface side.

The coating layer of the separator disclosed herein may comprise at least one organic material that melts when the electrochemical device is overheated to a temperature that is higher than the melting point of the at least one organic material to block the at least one channel for ionic flow within the separator. Thus the electrochemical device can be shut down as the ionic flow is blocked to ensure safety of the electrochemical device. If the at least one channel for ionic flow in the separator is not closed when the electrochemical device is overheated, the temperature of the electrochemical device may continue to rise, leading to deformation or fracture of the separator and resulting in internal short circuit. The internal short circuit can cause some accidents such as battery bulge, burning, explosion, etc.

In some embodiments, the at least one organic material may have a melting point ranging, for example, from 60° ° C. to 150° C., such as from 90° C. to 120° C. In addition, the melting point of the at least one organic material may depends on the requirements of electrochemical devices, e.g., various usages and working environment. Once the required melting point is determined, a specific organic material having the required melting point will be selected to be used for preparation of the coating layer for the separator. For example, when a battery is desired to shut down at 110° C., an organic material (such as PE particles) having a melting point of about 110° C. may be used to prepare a coating layer of the separator used in the battery. Further, for example, when a battery is desired to shut down at a temperature between 80° C. and 120° C., an organic material (such as PE particles) having a melting point of 80° ° C. for the outer shell and 120° ° C. for the inner core may be used to prepare a coating layer of the separator used in the battery.

In some embodiments, the melting point of the at least one organic material may be lower than that of the porous base membrane. When the at least one organic material in the coating layer melts to block the at least one channel for ionic flow, the porous base membrane can maintain its original size or shrink little, avoiding a short circuit of the positive electrode and the negative electrode.

Various organic materials having a suitable melting point may be used as the at least one organic material in the present disclosure. For example, the at least one organic material may be polyolefin or polyolefin derivatives, such as modified polyolefin, and oxidized polyolefin. Polyolefin disclosed herein may include both high density polyolefin with a density of 0.94-0.98 g/cm$^3$ and low density polyolefin with a density of 0.91-0.94 g/cm$^3$. The modified polyolefin disclosed herein may be obtained by at least one of various modification methods, including, for example, grafting, copolymerization, cross-linking, and blending. The oxidized polyolefin disclosed herein may, for example, be obtained by ring-opening polymerization of alkylene oxides with heterogeneous catalysis.

In some embodiments, the at least one organic material may be present in the coating layer in a form of particles with, for example, a core-shell structure. The particles of the at least one organic material may have an average particle size ranging, for example, from 0.01 to 10 μm, such as from 0.05 to 5 μm and further such as from 0.3 to 2 μm.

The at least one organic material may distribute uniformly or non-uniformly in the coating layer, as long as most channels (for example, from 80% to 95%) for ionic flow within the separator can be blocked when the at least one organic material melts. In one embodiment, the particles of the at least one organic material are distributed in the coating layer that the surface of the porous base membrane cannot be seen by naked eyes from the top.

Figure 2:
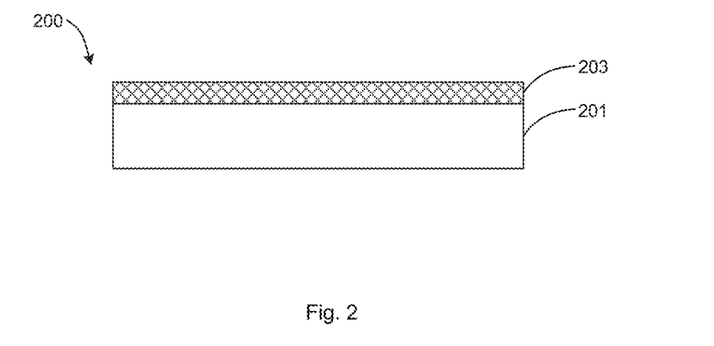
FIG. 2 illustrates a schematic diagram of an exemplary separator 200 according to another embodiment of the disclosure.

In some embodiments, the coating layer may further comprise at least one inorganic material. For example, as shown in FIG. 2, the separator 200 comprises a porous base membrane 201 and a coating layer 203 comprising at least one organic material and at least one inorganic material formed on one surface of the porous base membrane 201. The presence of the at least one inorganic material can improve the heat resistance of the separator and reduce thermal shrinkage of the porous base membrane at a high temperature. Various inorganic particles can be used as the at least one inorganic material, including, for example, an oxide, a hydroxide, a sulfide, a nitride, and a carbide, a carbonate, a sulfate, a phosphate, and a titanate, and the like of at least one of metallic and semiconductor elements, such as Si, Al, Ca, Ti, B, Sn, Mg, Li, Co, Ni, Sr, Ce, Zr, Y, Pb, Zn, Ba, and La. For example, one or more of alumina ($Al_2O_3$), boehmite (γ-AlOOH), silica ($SiO_2$), titanium oxide ($TiO_2$), cerium oxide ($CeO_2$), calcium oxide (CaO), zinc oxide (ZnO), magnesium oxide (MgO), lithium nitride ($Li_3N$), calcium carbonate ($CaCO_3$), barium sulfate ($BaSO_4$), lithium phosphate ($Li_3PO_4$), lithium titanium phosphate (LTPO), lithium aluminum titanium phosphate (LATP), cerium titanate ($CeTiO_3$), calcium titanate ($CaTiO_3$), barium titanate ($BaTiO_3$) and lithium lanthanum titanate (LLTO) can be used as the inorganic material. The inorganic material disclosed herein may have an average particle size ranging, for example, from 0.01 to 10 μm, such as from 0.5 to 5 μm. In some embodiments, the at least one organic material and the at least one inorganic material may have similar average particle sizes. For example, both organic and inorganic materials are of a size in nanoscale or micrometer scale.

When both the at least one organic material and the at least one inorganic material are present in the coating layer, the weight ratio of the two components may be controlled in a range to ensure that when the electrochemical device is overheated, thermal shrinkage of the porous base membrane can be minimized and/or prevented and an effective shut down can be realized. In some embodiments, the coating layer may comprise from 5 to 40 parts by weight of the at least one organic material and from 20 to 60 parts by weight of the at least one inorganic material. For example, the coating layer may comprise from 20 to 30 parts by weight of the at least one organic material and from 30 to 50 parts by weight of the at least one inorganic material.

In some embodiments, the coating layer may further comprise at least one agent chosen from binding agents, wetting agents, dispersants, and thickening agents. For example, the coating layer may further comprise at least one binding agent, at least one wetting agent, at least one dispersant, and at least one thickening agent.

The at least one binding agent disclosed herein may be chosen, for example, from acrylate, methyl acrylate, polyacrylic acid, polymethylacrylic acid, polyacrylate, polymethyl acrylate, polyethylacrylate, pure acrylate, copolymer of polyacrylic acid and polystyrene, polyvinyl pyrrolidone, styrene-butadiene rubber, butyronitrile rubber, epoxy resin, neopentyl glycol diacrylate, sodium polyacrylate, polytetrafluoroethylene, polyimide, polyamide, polyester, cellulose derivative, polysulfone, and copolymers thereof. The at least one wetting agent disclosed herein may be chosen, for example, from alkanotamide ethoxylate, sulfonated oil, fatty acid salt, sodium dibutylnaphthalenesulphonate, soya bean lecithin, thiol, hydrazide, copolymer of polyether and organosilicone, and mercaptal. The at least one thickening agent disclosed herein may be chosen, for example, from methyl cellulose, carboxymethylcellulose, hydroxy ethyl cellulose, hydroxypropyl methylcellulose and a salt thereof. The at least one dispersant disclosed herein may be chosen, for example, from copolymer of polyether and organosilicone, polyoxyethylene (PEO), polyvinyl alcohol, sodium polyacrylate, silicate, phosphate, sodium dodecyl sulfate, methylpentanol, cellulose derivative, polyacrylamide, guar gum and fatty acid polyglycol ester.

In some embodiments, the coating layer may be applied onto the porous base membrane with a slurry using a suitable technique, such as micro-gravure coating, blade coating, extrusion coating, spray coating, spin coating, or dip coating. At least a part of the slurry may penetrate into the pores of the porous base membrane.

Additionally, the coating layer of the separator disclosed herein may have a thickness ranging, for example, from 0.1 to 10 μm, such as from 0.5 to 5 μm.

In some embodiments, the separator disclosed herein may further comprise an inorganic layer comprising at least one inorganic material. Three examples are shown in FIG. 3, FIG. 4, and FIG. 5, respectively.

Figure 3:
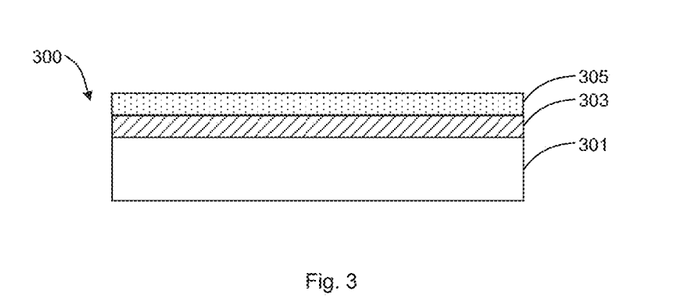
FIG. 3 illustrates a schematic diagram of an exemplary separator 300 according to yet another embodiment of the disclosure.

FIG. 3 illustrates a separator 300 that comprises a porous base membrane 301, a coating layer 303 comprising at least one organic material, and an inorganic layer 305 comprising at least one inorganic material. The coating layer 303 is disposed on one surface of the porous base membrane 301, and the inorganic layer 305 is disposed on at least one surface of the coating layer 303, thus the coating layer 303 is disposed between the porous base membrane 301 and the inorganic layer 305. In some embodiments, the other side of the porous base membrane 301 may be coated with an additional layer comprising at least one organic or inorganic material, for example, a binding polymer such as polyvinylidene fluoride (PVDF).

Figure 4:
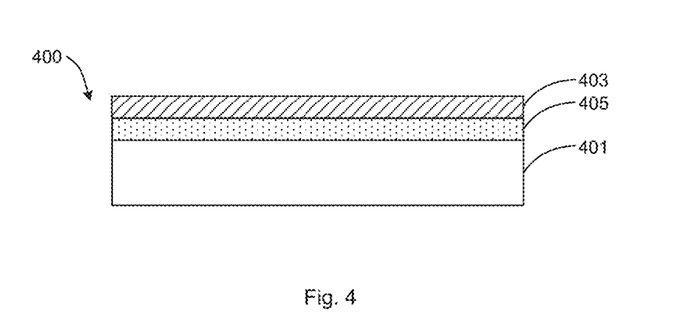
FIG. 4 illustrates a schematic diagram of an exemplary separator 400 according to yet another embodiment of the disclosure.

FIG. 4 illustrates a separator 400 that comprises a porous base membrane 401, a coating layer 403 comprising at least one organic material, and an inorganic layer 405 comprising at least one inorganic material. The inorganic layer 405 is disposed between the porous base membrane 401 and the coating layer 403. In some embodiments, the other side of the porous base membrane 401 may be coated with an additional layer comprising at least one organic or inorganic material, for example, a binding polymer such as PVDF.

Figure 5:
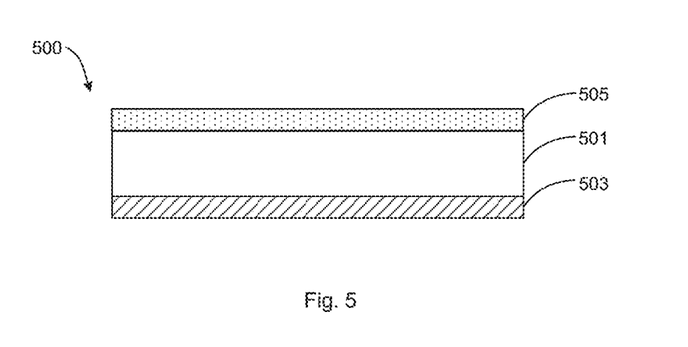
FIG. 5 illustrates a schematic diagram of an exemplary separator 500 according to yet another embodiment of the disclosure.

FIG. 5 illustrates a separator 500 that comprises a porous base membrane 501, a coating layer 503 comprising at least one organic material, and an inorganic layer 505 comprising at least one inorganic material. The coating layer 503 and the inorganic layer 505 are disposed on two sides of the porous base membrane 501 respectively. In some embodiments, an additional layer comprising at least one organic or inorganic material, for example, a binding polymer such as PVDF, may be formed on the outer side of the coating layer 503 or the inorganic layer 505.

The at least one inorganic material present in the inorganic layer disclosed herein may be chosen, for example, from alumina ($Al_2O_3$), boehmite (γ-AlOOH), silica ($SiO_2$), titanium oxide ($TiO_2$), cerium oxide ($CeO_2$), calcium oxide (CaO), zinc oxide (ZnO), magnesium oxide (MgO), lithium nitride ($Li_3N$), calcium carbonate ($CaCO_3$), barium sulfate ($BaSO_4$), lithium phosphate ($Li_3PO_4$), lithium titanium phosphate (LTPO), lithium aluminum titanium phosphate (LATP), cerium titanate ($CeTiO_3$), calcium titanate ($CaTiO_3$), barium titanate ($BaTiO_3$) and lithium lanthanum titanate (LLTO). In addition, the at least one inorganic material may have an average particle size ranging, for example, from 0.01 to 10 μm, such as from 0.5 to 5 μm.

Further disclosed herein are embodiments of methods for making the separators of the present disclosure. In some embodiments, the method comprises a wet coating process.

An embodiment of the method for making the separator 100 shown in FIG. 1 comprises:
  preparing a slurry comprising the at least one organic material and deionized water;
  coating the slurry on at least one surface of a porous base membrane to form a wet coating layer; and
  drying the wet coating layer.

The slurry prepared in the method disclosed above may comprise from 20 to 50 parts by weight of the at least one organic material and from 50 to 80 parts by weight of deionized water. In some embodiments, the slurry may further comprise from 5 to 10 parts by weight of at least one agent chosen from binding agents, wetting agents, dispersants, and thickening agents. The coating may be processed by micro-gravure coating, blade coating, extrusion coating, spray coating, spin coating, or dip coating. The wet coating layer may be dried by heating, such as being placed in an oven having a temperature ranging, for example, from 50° C. to 90° C., such as from 60° C. to 80° C.

An embodiment of the method for making the separator 200 shown in FIG. 2 comprises:
  preparing a mixed slurry comprising the at least one organic material, the at least one inorganic material, and deionized water;
  coating the mixed slurry on at least one surface of a porous base membrane to form a wet coating layer; and
  drying the wet coating layer.

The slurry prepared in the method disclosed above may comprise from 5 to 40 parts by weight of the at least one organic material and from 20 to 60 parts by weight of the at least one inorganic material, and from 40 to 60 parts by weight of deionized water. In some embodiments, the slurry may further comprise from 2 to 10 parts by weight of at least one binding agent. In some embodiments, the slurry may further comprise from 5 to 20 parts by weight of at least one agent chosen from wetting agents, dispersants, and thickening agents.

In some embodiments, the mixed slurry may be stirred to form a homogeneous slurry. Thus the coating layer 203 may have a substantially uniform structure, i.e., the at least one organic material and/or the at least one inorganic material may have a substantially homogeneous or uniform distribution in the coating layer.

An embodiment of the method for making the separator 300 shown in FIG. 3 comprises:
  preparing an organic slurry comprising the at least one organic material and deionized water;
  preparing an inorganic slurry comprising the at least one inorganic material, at least one binding agent, at least one wetting agent, and deionized water;
  coating the organic slurry on at least one surface of the porous base membrane to form a first wet coating layer;
  drying the first wet coating layer to obtain an organic layer;

coating the inorganic slurry on at least one surface of the organic layer to form a second wet coating layer; and drying the second wet coating layer.

In some embodiments, the organic slurry prepared in the method disclosed above may comprise from 20 to 50 parts by weight of the at least one organic material and from 50 to 80 parts by weight of deionized water. In some embodiments, the inorganic slurry prepared in the method disclosed above may comprise from 20 to 60 parts by weight of the at least one inorganic material, from 2 to 10 parts by weight of the at least one binding agent, from 5 to 20 parts by weight of the wetting agent, and from 40 to 60 parts by weight of deionized water.

An embodiment of the method for making the separator 400 shown in FIG. 4 comprises:

preparing an organic slurry comprising the at least one organic material and deionized water;

preparing an inorganic slurry comprising the at least one inorganic material, at least one binding agent, at least one wetting agent, and deionized water;

coating the inorganic slurry on at least one surface of the porous base membrane to form a first wet coating layer;

drying the first wet coating layer to obtain an inorganic layer;

coating the organic slurry on at least one surface of the inorganic layer to form a second wet coating layer; and drying the second wet coating layer.

In some embodiments, the organic slurry prepared in the method disclosed above may comprise from 20 to 50 parts by weight of the at least one organic material and from 50 to 80 parts by weight of deionized water. In some embodiments, the inorganic slurry prepared in the method disclosed above may comprise from 20 to 60 parts by weight of the at least one inorganic material, from 2 to 10 parts by weight of the at least one binding agent, from 5 to 20 parts by weight of the wetting agent, and from 40 to 60 parts by weight of deionized water.

An embodiment of the method for making the separator 500 shown in FIG. 5 comprises:

preparing an organic slurry comprising the at least one organic material and deionized water;

preparing an inorganic slurry comprising the at least one inorganic material, at least one binding agent, at least one wetting agent, and deionized water;

coating the organic slurry on one side of the porous base membrane to form a first wet coating layer;

drying the first wet coating layer to obtain an organic layer;

coating the inorganic slurry on the other side of the porous base membrane to form a second wet coating layer; and drying the second wet coating layer.

In some embodiments, the organic slurry prepared in the method disclosed above may comprise from 20 to 50 parts by weight of the at least one organic material and from 50 to 80 parts by weight of deionized water. In some embodiments, the inorganic slurry prepared in the method disclosed above may comprise from 20 to 60 parts by weight of the at least one inorganic material, from 2 to 10 parts by weight of the at least one binding agent, from 5 to 20 parts by weight of the wetting agent, and from 40 to 60 parts by weight of deionized water.

The thickness of the separator disclosed herein can be controlled in view of the requirements of electrochemical devices, e.g., lithium-ion batteries.

In one embodiment, the separator disclosed herein comprises a porous base membrane and a coating layer comprising at least one organic material. The at least one organic material melts when the electrochemical device is overheated to a temperature that is higher than the melting point of the at least one organic material to block the at least one channel for ionic flow, so that the electrochemical device shuts down to ensure safety. The separator disclosed herein can also have a low thermal shrinkage at high temperature to avoid short circuit. The separator disclosed herein can have a wide range of applications and can be used for making high-energy density and/or high-power density batteries in many stationary and portable devices, e.g., automotive batteries, batteries for medical devices, and batteries for other large devices.

Further, the present disclosure provides an electrochemical device comprising: a positive electrode, a negative electrode, and a separator disclosed herein, which is interposed between the positive electrode and the negative electrode. An electrolyte may be further included in the electrochemical device of the present disclosure. The separator is sandwiched between the positive electrode and the negative electrode to prevent physical contact between the two electrodes and the occurrence of a short circuit. The porous structure of the separator ensures a passage of ionic charge carriers (e.g., lithium ions) between the positive electrode and the negative electrode. In addition, the separator disclosed herein may also provide a mechanical support to the electrochemical device. The electrochemical devices disclosed herein include any device in which electrochemical reactions occur. For example, the electrochemical device disclosed herein includes primary batteries, secondary batteries, fuel cells, solar cells and capacitors. In some embodiments, the electrochemical device disclosed herein is a lithium secondary battery, such as a lithium metal secondary battery, a lithium ion secondary battery, a lithium polymer secondary battery, and a lithium sulfur secondary battery.

With the separator of the present disclosure inside, the electrochemical device disclosed herein can exhibit improved safety at a high temperature as discussed above.

The electrochemical device disclosed herein may be manufactured by a conventional method known to one skilled in the art. In one embodiment, an electrode assembly is formed by placing a separator of the present disclosure between a positive electrode and a negative electrode, and an electrolyte is injected into the electrode assembly. The electrode assembly may be formed by a conventional process, such as a winding process or a lamination (stacking) and folding process.

Reference is now made in detail to the following examples. It is to be understood that the following examples are illustrative only and the present disclosure is not limited thereto.

Example 1

Preparation of an inorganic slurry. 1 part by weight of sodium polyacrylate aqueous solution (41-43 wt %) and 40 parts by weight of alumina (average particle size being 0.5 μm) were added into 48 parts by weight of deionized water to obtain a mixture. After the mixture was stirred and ground in a grinding machine for 25 minutes, 5 parts by weight of sodium carboxymethyl cellulose aqueous solution (4 wt %) and 1 part by weight of copolymer of polyether and organosilicone (Mw of 6,000) were added into the mixture and dispersed by stirring. 5 parts by weight of methyl acrylate aqueous solution (45 wt %) was added into the mixture and dispersed by stirring to obtain the inorganic slurry.

Preparation of an organic slurry. 40 part by weight of organic core-shell PE powder (average particle size of 0.5

μm, Mw of 50,000, density of 0.93 g/cm$^3$, the melting point of the outer shell being 80° C. and the melting point of the inner core being 110° C.) was added into 55 parts by weight of deionized water and dispersed by stirring to obtain a mixture. 5 parts by weight of sodium carboxymethyl cellulose aqueous solution (4 wt %) was added into the mixture and dispersed by stirring to obtain the organic slurry.

Preparation of a separator. The inorganic slurry was coated on one side of a porous PE membrane having a thickness of 12 μm to obtain a wet inorganic layer, which was then dried at 80° C. The organic slurry was coated on an outer side of the inorganic layer to obtain a wet organic layer, which was then dried at 80° C.

Example 2

The same procedures for preparation of an inorganic slurry as set forth above in Example 1 were used to prepare an inorganic slurry.

A core-shell PE particle emulsion of 20 wt % was used as the organic slurry directly. The organic core-shell PE particles dispersed in the core-shell PE emulsion had an average particle size of 0.5 μm, Mw of 50,000, density of 0.93 g/cm$^3$, the melting point of the outer shell being 80° C. and the melting point of the inner core being 110° C.

Preparation of a separator. The organic slurry was coated on one side of a porous PE membrane having a thickness of 12 μm to obtain a wet organic layer, which was then dried at 80° C. The inorganic slurry was coated on an outer side of the organic layer to obtain a wet inorganic layer, which was then dried at 80° C.

Example 3

The same procedures for preparation of an inorganic slurry as set forth above in Example 1 were used to prepare an inorganic slurry.

The core-shell PE particle emulsion as set forth in Example 2 was used as the organic slurry.

Preparation of a separator. The inorganic slurry was coated on both sides of a porous PE membrane having a thickness of 12 μm to obtain a wet inorganic layer on each side, which was then dried at 80° C. The organic slurry was coated on an outer side of each of the inorganic layers to obtain a wet organic layer on each side, which was then dried at 80° C. A separator having a five-layer structure was obtained.

Example 4

The same procedures for preparation of an inorganic slurry as set forth above in Example 1 were used to prepare an inorganic slurry.

The core-shell PE particle emulsion as set forth in Example 2 was used as the organic slurry.

Preparation of a separator. On one side of a porous PE membrane having a thickness of 12 μm, the organic slurry was coated firstly which was then dried at 80° C. to obtain an organic layer, on the outer surface of which the inorganic slurry was coated and then dried at 80° C. On the other side of the porous PE membrane, the inorganic slurry was coated firstly which was then dried at 80° C. to obtain an inorganic layer, on the outer surface of which the organic slurry was coated and then dried at 80° C. A separator having a five-layer structure was obtained.

Example 5

Preparation of a mixed slurry. 1 part by weight of sodium polyacrylate aqueous solution (41-43 wt %) and 5 parts by weight of alumina (average particle size being 1 μm) were added into 33 parts by weight of deionized water to obtain a mixture. After the mixture was stirred and ground in a grinding machine for 25 minutes, 5 parts by weight of sodium carboxymethyl cellulose aqueous solution (4 wt %) and 1 part by weight of copolymer of polyether and organosilicone (Mw of 6,000) were added into the mixture and dispersed by stirring. 50 part by weight of core-shell PE particle emulsion (40 wt %, the core-shell PE particles dispersed in the core-shell PE particle emulsion had an average particle size of 2 μm, Mw of 150,000, density of 0.96 g/cm$^3$, and the melting point of the outer shell being 110° C. and the melting point of the inner core being 140° C.) was added into the mixture. At last, 5 parts by weight of methyl acrylate aqueous solution (45 wt %) was added into the mixture and dispersed by stirring to obtain the mixed slurry.

Preparation of a separator. The mixed slurry was uniformly coated on one side of a porous PE membrane having a thickness of 12 μm to obtain a wet layer, which was then dried at 80° C.

Example 6

Preparation of a mixed slurry. 1 part by weight of sodium polyacrylate aqueous solution (41-43 wt %) and 10 parts by weight of alumina (average particle size being 1 μm) were added into 53 parts by weight of deionized water to obtain a mixture. After the mixture was stirred and ground in a grinding machine for 25 minutes, 5 parts by weight of sodium carboxymethyl cellulose aqueous solution (4 wt %) and 1 part by weight of copolymer of polyether and organosilicone (Mw of 6,000) were added into the mixture and dispersed by stirring. 25 part by weight of core-shell PE particle emulsion (40 wt %, the core-shell PE particles dispersed in the core-shell PE particle emulsion had an average particle size of 2 μm, Mw of 150,000, density of 0.96 g/cm$^3$, and the melting point of the outer shell being 110° C. and the melting point of the inner core being 140° C.) was added into the mixture. At last, 5 parts by weight of methyl acrylate aqueous solution (45 wt %) was added into the mixture and dispersed by stirring to obtain the mixed slurry.

Preparation of a separator. The mixed slurry was uniformly coated on one side of a porous PE membrane having a thickness of 12 μm to obtain a wet layer, which was then dried at 80° C.

Example 7

Preparation of a mixed slurry. 1 part by weight of sodium polyacrylate aqueous solution (41-43 wt %) and 20 parts by weight of alumina (average particle size being 1 μm) were added into 55 parts by weight of deionized water to obtain a mixture. After the mixture was stirred and ground in a grinding machine for 25 minutes, 5 parts by weight of sodium carboxymethyl cellulose aqueous solution (4 wt %) and 1 part by weight of copolymer of polyether and organosilicone (Mw of 6,000) were added into the mixture and dispersed by stirring. 13 part by weight of core-shell PE particle emulsion (40 wt %, the core-shell PE particles dispersed in the core-shell PE particle emulsion had an average particle size of 2 μm, Mw of 150,000, density of 0.96 g/cm$^3$, and the melting point of the outer shell being 110° C. and the melting point of the inner core being 140° C.) was added into the mixture. At last, 5 parts by weight of methyl acrylate aqueous solution (45 wt %) was added into the mixture and dispersed by stirring to obtain the mixed slurry.

Preparation of a separator. The mixed slurry was uniformly coated on one side of a porous PE membrane having a thickness of 12 μm to obtain a wet layer, which was then dried at 80° C.

Example 8

The same procedures for preparation of a separator as set forth above in Example 7 were used to prepare a separator except that both sides of the PE base membrane were coated with the mixed slurry.

Example 9

The same procedures for preparation of a separator as set forth above in Example 7 were used to prepare a separator except that silica (average particle size being 1 μm) was used instead of alumina.

Example 10

The same procedures for preparation of a separator as set forth above in Example 7 were used to prepare a separator except that a core-shell polybutylene emulsion (40 wt %, the core-shell polybutylene particles dispersed in the core-shell polybutylene emulsion had an average particle size of 0.5 μm, Mw of 200,000, density of 0.91 g/cm$^3$, and the melting point of the outer shell being 110° C. and the melting point of the inner core being 140° C.) was used instead of the PE emulsion.

Example 11

Preparation of a separator. A core-shell PE particle emulsion (40 wt %, the core-shell PE particles dispersed in the core-shell PE particle emulsion had an average particle size of 2 μm, Mw of 80,000, density of 0.92 g/cm$^3$, and the melting point of the outer shell being 110° C. and the melting point of the inner core being 140° C.) was uniformly coated on one side of a porous PE membrane having a thickness of 12 μm to obtain a wet coating layer, which was then dried at 80° C.

Example 12

Preparation of a separator. A core-shell PE particle emulsion (40 wt %, the core-shell PE particles dispersed in the core-shell PE particle emulsion had an average particle size of 2 μm, Mw of 80,000, density of 0.92 g/cm$^3$, and the melting point of the outer shell being 110° C. and the melting point of the inner core being 140° C.) was uniformly coated on both sides of a porous PE membrane having a thickness of 12 μm to obtain a wet coating layer, which was then dried at 80° C.

Comparative Example 1

Preparation of an inorganic slurry. 1 part by weight of sodium polyacrylate aqueous solution (41-43 wt %) and 40 parts by weight of alumina (average particle size being 2 μm) were added into 48 parts by weight of deionized water to obtain a mixture. After the mixture was stirred and ground in a grinding machine for 25 minutes, 5 parts by weight of sodium carboxymethyl cellulose aqueous solution (4 wt %) and 1 part by weight of copolymer of polyether and organosilicone (Mw of 6,000) were added into the mixture and dispersed by stirring. 5 parts by weight of methyl acrylate aqueous solution (45 wt %) was added into the mixture and dispersed by stirring to obtain the inorganic slurry.

Preparation of a separator. The inorganic slurry was uniformly coated on one side of a porous PE membrane having a thickness of 12 μm to obtain a wet inorganic layer, which was then dried at 80° C.

Comparative Example 2

The same procedures for preparation of a separator as set forth above in Comparative Example 1 were used to prepare a separator except that silica (average particle size being 1 μm) was used instead of alumina.

Comparative Example 3

Preparation of a slurry. 1 part by weight of sodium polyacrylate aqueous solution (41-43 wt %) and 25 parts by weight of alumina (average particle size being 1 μm) were added into 58 parts by weight of deionized water to obtain a mixture. After the mixture was stirred and ground in a grinding machine for 25 minutes, 5 parts by weight of sodium carboxymethyl cellulose aqueous solution (4 wt %) and 1 part by weight of copolymer of polyether and organosilicone (Mw of 6,000) were added into the mixture and dispersed by stirring. 5 parts by weight of PVDF powder (average particle size being 0.5 μm) was added into the mixture. At last, 5 parts by weight of methyl acrylate aqueous solution (45 wt %) was added into the mixture and dispersed by stirring to obtain the PVDF/alumina slurry.

Preparation of a separator. The PVDF/alumina slurry was uniformly coated on one side of a porous PE membrane having a thickness of 12 μm to obtain a wet layer, which was then dried at 80° C.

Comparative Example 4

The same procedures for preparation of an inorganic slurry as set forth above in Example 1 were used to prepare an inorganic slurry.

Preparation of a PVDF slurry. 40 parts by weight of PVDF powder (average particle size of 0.5 μm) was added into 50 parts by weight of deionized water and dispersed by stirring to obtain a mixture. 5 parts by weight of sodium carboxymethyl cellulose aqueous solution (4 wt %) was added into the mixture and dispersed by stirring. At last, 5 parts by weight of methyl acrylate aqueous solution (45 wt %) was added into the mixture and dispersed by stirring to obtain the PVDF slurry.

Preparation of a separator. The inorganic slurry was coated on one side of a porous PE membrane having a thickness of 12 μm to obtain a wet inorganic layer, which was then dried at 80° C. The PVDF slurry was coated on an outer side of the inorganic layer to obtain a wet PVDF layer, which was then dried at 80° C.

Comparative Example 5

A porous PE membrane having a thickness of 12 μm was used as a separator directly.

The following Tests 1-4 were conducted on the separators prepared in Examples 1-12 and Comparative Examples 1-5. The test results were shown in Table 1.

Test 1 High Temperature Stability

The separators prepared in Examples 1-10 and Comparative Examples 1-4 were kept at 120° ° C. for 1 hour for heat treatment. The separators prepared in Examples 11-12 were kept at 105° C. for 1 hour for heat treatment. Two samples of the separator of Comparative Examples 5 were respectively heat treated at 120° C. and 105° C. for 1 hour.

The separators after the above heat treatment were checked and observed by naked eyes. If the separator is deformed, or the surface of the separator is wrinkled, uneven, curled or has mark, it is not stable at the test temperature. Otherwise, the separator is stable at the test temperature.

Test 2 Thermal Shrinkage

For each of the separators prepared in Examples 1-12 and Comparative Examples 1-5, a thermal shrinkage percentages at transverse direction (TD) after the heat treatment in Test 1 was measured using a binary optics projector.

Test 3 Air Permeability Increase

For each of the separators prepared in Examples 1-12 and Comparative Examples 1-5, the Air Permeability Increase value is calculated by:

Air Permeability Increase=the air permeability value of the separator after heating treatment in Test 1−the air permeability value of the separator before the heating treatment in Test 1.

The air permeability values are measured using an Air-permeability Tester (Asahi-Seiko, EGO1-65-2MR).

Test 4 Battery Shut Down

For each of the separators prepared in Examples 1-12 and Comparative Examples 1-5, a button cell was prepared using lithium cobaltate ($LiCoO_2$) as a positive electrode, graphite as a negative electrode, an electrolyte containing $LiPF_6$ and the separator. For Examples 1-2, the button cell was heated to 100° C. and kept at 100° ° C. for two hours. For Examples 3-12 and Comparative Examples 1-5, the button cell was heated to 120° C. and kept at 120° C. for two hours. After that, a charge-discharge test was conducted for the button cell. If the button cell can be charged or discharged, it indicated that the button cell did not shut down. Otherwise, the button cell shut down successfully, i.e., it could not be charged or discharged. The button cells that shut down after the heat treatment have higher safety than those could not shut down when heated.

TABLE 1

Test Results

| Separator | Stability at 120° C. | Stability at 105° C. | TD Thermal Shrinkage (%) | Air Permeability Increase (sec/100 ml) | Battery Shut Down after Heat Treatment |
|---|---|---|---|---|---|
| Example 1 | Stable | / | 0.62 | 5483 | Yes |
| Example 2 | Stable | / | 0.66 | 5624 | Yes |
| Example 3 | Stable | / | 0.59 | 5832 | Yes |
| Example 4 | Stable | / | 0.64 | 6023 | Yes |
| Example 5 | Stable | / | 1.80 | 8894 | Yes |
| Example 6 | Stable | / | 0.93 | 4483 | Yes |
| Example 7 | Stable | / | 0.68 | 3674 | Yes |
| Example 8 | Stable | / | 0.73 | 3863 | Yes |
| Example 9 | Stable | / | 0.71 | 3269 | Yes |
| Example 10 | Stable | / | 0.48 | 1321 | Yes |
| Example 11 | / | Stable | 0.89 | 1023 | Yes |
| Example 12 | / | Stable | 0.93 | 1298 | Yes |
| Comparative Example 1 | Stable | / | 0.25 | 35 | No |
| Comparative Example 2 | Stable | / | 0.26 | 40 | No |
| Comparative Example 3 | Stable | / | 0.33 | 38 | No |
| Comparative Example 4 | Stable | / | 0.36 | 44 | No |
| Comparative Example 5 | Deformed | Stable | 0.29(105° C.) 2.71(120° C.) | / | / |

As shown in Table 1, the separators prepared in Examples 1-10 kept their size stable at 120° C. The separators prepared in Examples 11-12 kept their size stable at 105° ° C. but deformed at 120° C., as they did not contain inorganic material in the coating layer. It was indicated that the presence of inorganic material in the coating layer could improve the heat resistance of the separator.

As to the Air Permeability Increase, the separators prepared in Examples 1-12 had much higher air permeability increase comparing with the separators prepared in Comparative Examples 1-5. The higher the air permeability increase value was, more ionic flow channels within the separator were blocked. Therefore, for the separators prepared in Examples 1-12, more ionic flow channels within the separators were blocked after the heat treatment in Test 1 than the separators prepared in Comparative Examples 1-5. The Battery Shut Down Test results shown in Table 1 also confirmed this conclusion.

Figure 6:
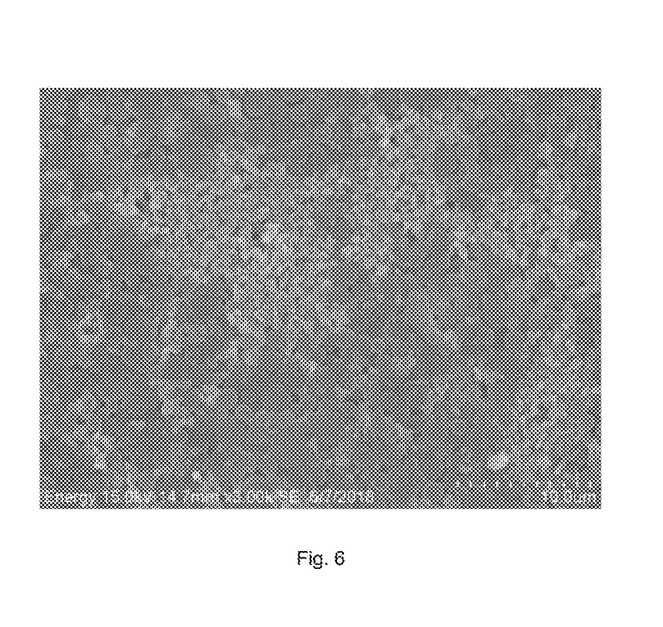
FIG. 6 is a scanning electron microscope (SEM) graph of the separator prepared in Example 6 before the heat treatment in Test 1.
Figure 7:
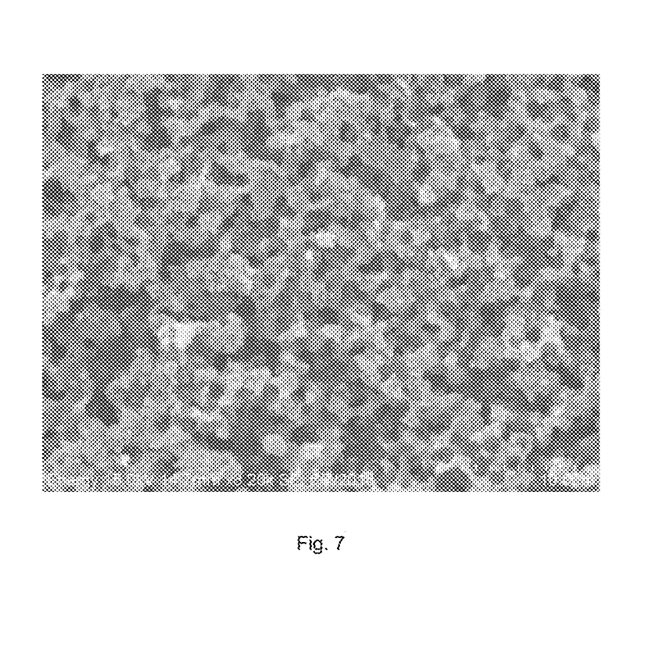
FIG. 7 is a SEM graph of the separator prepared in Example 6 after the heat treatment in Test 1.

FIG. 6 and FIG. 7 showed the SEM graphs of the separator prepared in Example 1 before and after the heat treatment in Test 1. As FIG. 6 and FIG. 7 showed, the PE particles melted after the heat treatment.

What is claimed is:

1. A separator for an electrochemical device, comprising:
   a porous base membrane;
   a coating layer disposed on at least one side of the porous base membrane; and
   at least one channel for ionic flow,
   wherein the coating layer comprises at least one organic material with a core-shell structure comprising an inner core made of polyethylene (PE) and an outer shell made of polyethylene (PE), a melting point of the outer shell is lower than a melting point of the inner core, and the melting point of the outer shell is lower than a melting point of the porous base membrane, and
   wherein the core-shell structure is in a form of particles that melts when the electrochemical device is overheated to a temperature that is higher than the melting point of the outer shell to block the at least one channel for ionic flow.

2. The separator according to claim 1, wherein the porous base membrane comprises at least one chosen from polyolefin, aramids, polyamides, and nonwoven fibers.

3. The separator according to claim 1, further comprising an inorganic layer comprising at least one inorganic material disposed between the porous base membrane and the coating layer.

4. The separator according to claim 1, further comprising an inorganic layer comprising at least one inorganic material, wherein the coating layer and the inorganic layer are disposed on two sides of the porous base membrane respectively.

5. The separator according to claim 1, further comprising an inorganic layer comprising at least one inorganic material disposed on at least one surface of the coating layer, wherein the coating layer is disposed between the porous base membrane and the inorganic layer.

6. The separator according to claim 1, wherein the at least one organic material in a form of particles have an average particle size ranging from 0.01 to 10 μm.

7. The separator according to claim 1, wherein the melting point of the outer shell ranges from 80 to 110° C., and the melting point of the inner core ranges from 110 to 120° C.

8. The separator according to claim 1, wherein the coating layer further comprises at least one agent chosen from binding agents, wetting agents, dispersants, and thickening agents.

9. The separator according to claim 8, wherein the coating layer further comprises at least one binding agent, at least one wetting agent, at least one dispersant, and at least one thickening agent.

10. The separator according to claim 1, wherein the coating layer further comprises at least one inorganic material.

11. The separator according to claim 10, wherein the at least one inorganic material is in a form of particles having an average particle size ranging from 0.01 to 10 pin.

12. The separator according to claim 10, wherein the coating layer comprises from 5 to 40 parts by weight of the at least one organic material and from 20 to 60 parts by weight of the inorganic material.

13. The separator according to claim 10, wherein the at least one inorganic material is chosen from alumina, boehmite, silica, titanium oxide, cerium oxide, calcium oxide, zinc oxide, magnesium oxide, lithium nitride, calcium carbonate, barium sulfate, lithium phosphate, lithium titanium phosphate, lithium aluminum titanium phosphate, cerium titanate, calcium titanate, barium titanate, and lithium lanthanum titanate.

14. An electrochemical device comprising a positive electrode, a negative electrode, and a separator according to claim 1 interposed between the positive electrode and the negative electrode.

15. A method for making the separator of claim 1, comprising:
preparing a slurry comprising the at least one organic material and deionized water;
coating the slurry on at least one surface of the porous base membrane to form a wet coating layer; and
drying the wet coating layer.

16. The method according to claim 15, wherein the coating is processed by micro-gravure coating, blade coating, extrusion coating, spray coating, spin coating, or dip coating.

17. A method for making the separator of claim 10, comprising:
preparing a mixed slurry comprising the at least one organic material, the at least one inorganic material, and deionized water;
coating the mixed slurry on at least one surface of the porous base membrane to form a wet coating layer; and
drying the wet coating layer.

18. The method according to claim 17, wherein the mixed slurry comprises from 5 to 40 parts by weight of the at least one organic material and from 20 to 60 parts by weight of the at least one inorganic material, and from 40 to 60 parts by weight of deionized water.

19. The method according to claim 17, wherein the mixed slurry further comprises at least one agent chosen from binding agents, wetting agents, dispersants, and thickening agents.

20. The method according to claim 19, where in the mixed slurry further comprises at least one binding agent, at least one wetting agent, at least one dispersant, and at least one thickening agent.

21. A method for making the separator of claim 5, comprising:
preparing an organic slurry comprising the at least one organic material and deionized water;
preparing an inorganic slurry comprising the at least one inorganic material, at least one binding agent, at least one wetting agent, and deionized water;
coating the organic slurry on at least one surface of the porous base membrane to form a first wet coating layer;
drying the first wet coating layer to obtain an organic layer;
coating the inorganic slurry on at least one surface of the organic layer to form a second wet coating layer; and
drying the second wet coating layer.

22. The method according to claim 21, wherein the organic slurry comprises from 20 to 50 parts by weight of the at least one organic material and from 50 to 80 parts by weight of deionized water.

23. The method according to claim 21, wherein the inorganic slurry comprises from 20 to 60 parts by weight of the at least one inorganic material, from 2 to 10 parts by weight of the at least one binding agent, from 5 to 20 parts by weight of the wetting agent, and from 40 to 60 parts by weight of deionized water.

24. A method for making the separator of claim 3, comprising:
preparing an organic slurry comprising the at least one organic material and deionized water;
preparing an inorganic slurry comprising the at least one inorganic material, at least one binding agent, at least one wetting agent, and deionized water;
coating the inorganic slurry on at least one surface of the porous base membrane to form a first wet coating layer;
drying the first wet coating layer to obtain an inorganic layer;
coating the organic slurry on at least one surface of the inorganic layer to form a second wet coating layer; and
drying the second wet coating layer.

25. A method for making the separator of claim 4, comprising:
preparing an organic slurry comprising the at least one organic material and deionized water;
preparing an inorganic slurry comprising the at least one inorganic material, at least one binding agent, at least one wetting agent, and deionized water;
coating the organic slurry on one side of the porous base membrane to form a first wet coating layer;
drying the first wet coating layer to obtain an organic layer;
coating the inorganic slurry on the other side of the porous base membrane to form a second wet coating layer; and
drying the second wet coating layer.

* * * * *